US008090753B2

(12) United States Patent
Takahashi

(10) Patent No.: US 8,090,753 B2
(45) Date of Patent: *Jan. 3, 2012

(54) IMAGE INPUT SYSTEM INCLUDING REMOTE IMAGE INPUT APPARATUS HAVING DISPLAY AND EXTERNAL APPARATUS HAVING STORAGE MEANS, AND CONTROL METHOD OR CONTROLLING STORAGE OF INPUT IMAGE INFORMATION BY REMOTE CONTROL OF FILE DIRECTORY MANAGEMENT FOR STORAGE MEANS

(75) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 11/834,358

(22) Filed: Aug. 6, 2007

(65) Prior Publication Data

US 2007/0283055 A1    Dec. 6, 2007

Related U.S. Application Data

(62) Division of application No. 09/572,793, filed on May 17, 2000, now Pat. No. 7,269,600.

(30) Foreign Application Priority Data

May 20, 1999   (JP) .................................. 11-140728

(51) Int. Cl.
G06F 17/30         (2006.01)

(52) U.S. Cl. .................... 707/824; 348/207.1; 348/207.2
(58) Field of Classification Search .................... 707/10, 707/100, 104.1, 200, 821, 824, 999.107; 348/207.99, 207.1, 207.2
See application file for complete search history.

(56) References Cited

U.S. PATENT DOCUMENTS

| | | | |
|---|---|---|---|
| 5,231,501 A | 7/1993 | Sakai | 348/231.9 |
| 5,235,680 A | 8/1993 | Bijnagte | 707/10 |
| 5,706,457 A | 1/1998 | Dwyer et al. | 345/835 |
| 5,806,072 A | 9/1998 | Kuba et al. | 248/231.2 |
| 5,848,420 A | 12/1998 | Xu | 707/104.1 |
| 5,914,787 A | 6/1999 | Satoh et al. | 358/402 |
| 5,940,831 A | 8/1999 | Takano | 707/10 |
| 6,017,157 A | 1/2000 | Garfinkle et al. | 396/639 |
| 6,020,982 A | 2/2000 | Yamauchi et al. | 358/444 |
| 6,035,323 A | 3/2000 | Narayen et al. | 709/201 |
| 6,111,586 A | 8/2000 | Ikeda et al. | 345/619 |
| 6,279,014 B1 | 8/2001 | Schilit et al. | 715/512 |
| 6,373,507 B1 | 4/2002 | Camara et al. | 345/825 |
| 6,408,301 B1 | 6/2002 | Patton et al. | 707/102 |
| 6,658,202 B1 | 12/2003 | Battaglia et al. | 386/117 |
| 6,674,472 B1 | 1/2004 | Tsutsui | 348/333.05 |
| 6,690,417 B1 | 2/2004 | Yoshida et al. | 348/231.1 |
| 6,745,256 B2 * | 6/2004 | Suzuki et al. | 710/18 |
| 6,930,709 B1 * | 8/2005 | Creamer et al. | 348/211.3 |

(Continued)

*Primary Examiner* — Leslie Wong
(74) *Attorney, Agent, or Firm* — Fitzpatrick, Cella, Harper & Scinto

(57) ABSTRACT

In a system, in order to allow transfer of information relating to image data and the like to a desired directory in a directory structure in a host information processing apparatus, without performing an operation at the host information processing apparatus, a directory-information management unit in a first apparatus acquires and manages directory information of a storage unit managed by a filing system of a second apparatus, and a display unit displays the directory information managed by the directory-information management unit. The user assigns a directory to which the image data and the like are to be transferred in the storage unit of the second apparatus, using an assignment unit.

18 Claims, 7 Drawing Sheets

U.S. PATENT DOCUMENTS

| | | | |
|---|---|---|---|
| 7,107,516 B1 * | 9/2006 | Anderson et al. | 715/210 |
| 7,154,543 B1 * | 12/2006 | Shiohara | 348/231.2 |
| 7,161,618 B1 * | 1/2007 | Niikawa et al. | 348/207.1 |
| 7,337,403 B2 * | 2/2008 | Pavley et al. | 715/747 |
| 7,530,024 B2 * | 5/2009 | Takahashi et al. | 715/763 |
| 2002/0054224 A1 | 5/2002 | Wasula et al. | 348/232 |
| 2003/0115286 A1 * | 6/2003 | Mayle et al. | 709/217 |
| 2003/0189642 A1 | 10/2003 | Bean et al. | 348/207.1 |

* cited by examiner

IMAGE INPUT SYSTEM INCLUDING REMOTE IMAGE INPUT APPARATUS HAVING DISPLAY AND EXTERNAL APPARATUS HAVING STORAGE MEANS, AND CONTROL METHOD OR CONTROLLING STORAGE OF INPUT IMAGE INFORMATION BY REMOTE CONTROL OF FILE DIRECTORY MANAGEMENT FOR STORAGE MEANS

BACKGROUND OF THE INVENTION

1. Field of the Invention

The present invention relates to an information processing apparatus, an information processing system, and an information processing method that are applied to a system or an apparatus in which, for example, an image input apparatus, such as a digital camera or the like, and a host information processing apparatus are connected to each other so as to be able to perform communication, and image data and the like are transmitted/received between these apparatuses, and to a storage medium which stores processing steps for executing the above-described operations, so as to be readable by a computer.

2. Description of the Related Art

Conventionally, for example, in a system in which an image input apparatus, such as a digital still camera or the like, and a host information processing apparatus, such as a personal computer (hereinafter abbreviated as a "PC") or the like, are connected to each other, in general, image data obtained by the image input apparatus (image data obtained by a photographing operation, and the like) is temporarily stored in a storage medium provided in the image input apparatus, and is then transferred to a storage medium provided in the host information processing apparatus. This is because the unit price per bit of a storage medium provided in the image input apparatus is higher than that of a nonvolatile large-capacity storage medium, such as a hard disk or the like, provided in the host information processing apparatus.

In the above-described conventional system, however, in order to transfer image data obtained by the image input apparatus to a specific directory in a file structure managed by the host information processing apparatus, the user must assign a directory to which the image data is to be transferred, by performing a predetermined operation in the host information processing apparatus, after providing a state of allowing communication by connecting the image input apparatus to the host information processing apparatus using a serial cable or the like.

For that purpose, the user must perform very troublesome operations for photographing an image, transferring image data, and the like while moving between the image input apparatus and the host information processing apparatus. Furthermore, for a user who does not know well how to deal with the host information processing apparatus, for example, it is very difficult to perform an operation for assigning a directory to which the image data is to be transferred.

SUMMARY OF THE INVENTION

The present invention has been made in consideration of the above-described problems.

It is an object of the present invention to improve the operability of an apparatus when transferring data.

It is another object of the present invention to allow a user to excellently instruct transfer of image data with a good operability only by an operation at an image input apparatus.

It is still another object of the present invention to provide an information processing apparatus, an information processing system and an information processing method in which the user can easily transfer data to a desired directory, by improving the operability, and a storage medium which stores processing steps for executing such an operation, so as to be readable by a computer.

It is yet another object of the present invention to provide a data transfer system and method, and a storage medium suitable for a digital still camera.

It is yet a further object of the present invention to provide a digital camera having new functions.

According to one aspect, the present invention relates to an information processing apparatus including display control means for acquiring directory information of storage means within an external apparatus, from the external apparatus, and for causing display means to display the acquired directory information, and assignment means for assigning a directory in the storage means to which arbitrary information is to be transferred, based on the directory information displayed by the display means.

According to another aspect, the present invention relates to an information processing apparatus connected to an external apparatus. The information processing apparatus includes directory-information management means for acquiring and managing directory information of storage means managed by a file system of the external apparatus, and display control means for causing display means to display the directory information managed by the directory-information management means.

According to still another aspect, the present invention relates to an information processing apparatus connected to an external apparatus so as to be able to at least transmit/receive arbitrary information. The information processing apparatus includes storage means for storing the arbitrary information in an arbitrary directory in a hierarchical directory structure, in units of a file, file management means for managing the directory structure in the storage means, and transmission means for transmitting information relating to the directory structure managed by the file management means to the external apparatus, based on a request from the external apparatus.

According to yet another aspect, the present invention relates to an information processing method for storing arbitrary information obtained by a first apparatus into storage means within a second apparatus. The information processing method includes, in the first apparatus, a display step for acquiring and displaying directory information of the storage means from the second apparatus and for displaying the acquired directory information, and an assignment step for assigning a directory in the storage means to which the arbitrary information is to be transferred, based on the directory information displayed in the display step.

According to yet a further aspect, the present invention relates to an information processing method for storing arbitrary information obtained by a first apparatus into storage means within a second apparatus. The information processing method includes, in the first apparatus, a directory-information management step for acquiring directory information of the storage means managed by a filing system of the second apparatus, from the second apparatus, and for managing the acquired directory information, and a display step for displaying the directory information managed in the directory-information management step.

According to still another aspect, the present invention relates to a storage medium storing processing steps of any one of the above-described information processing methods, so as to be readable by a computer.

The foregoing and other objects, advantages and features of the present invention will become more apparent from the following description of the preferred embodiments taken in conjunction with the accompanying drawings.

DESCRIPTION OF THE PREFERRED EMBODIMENTS

Preferred embodiments of the present invention will now be described with reference to the drawings.

First Embodiment

Figure 1:
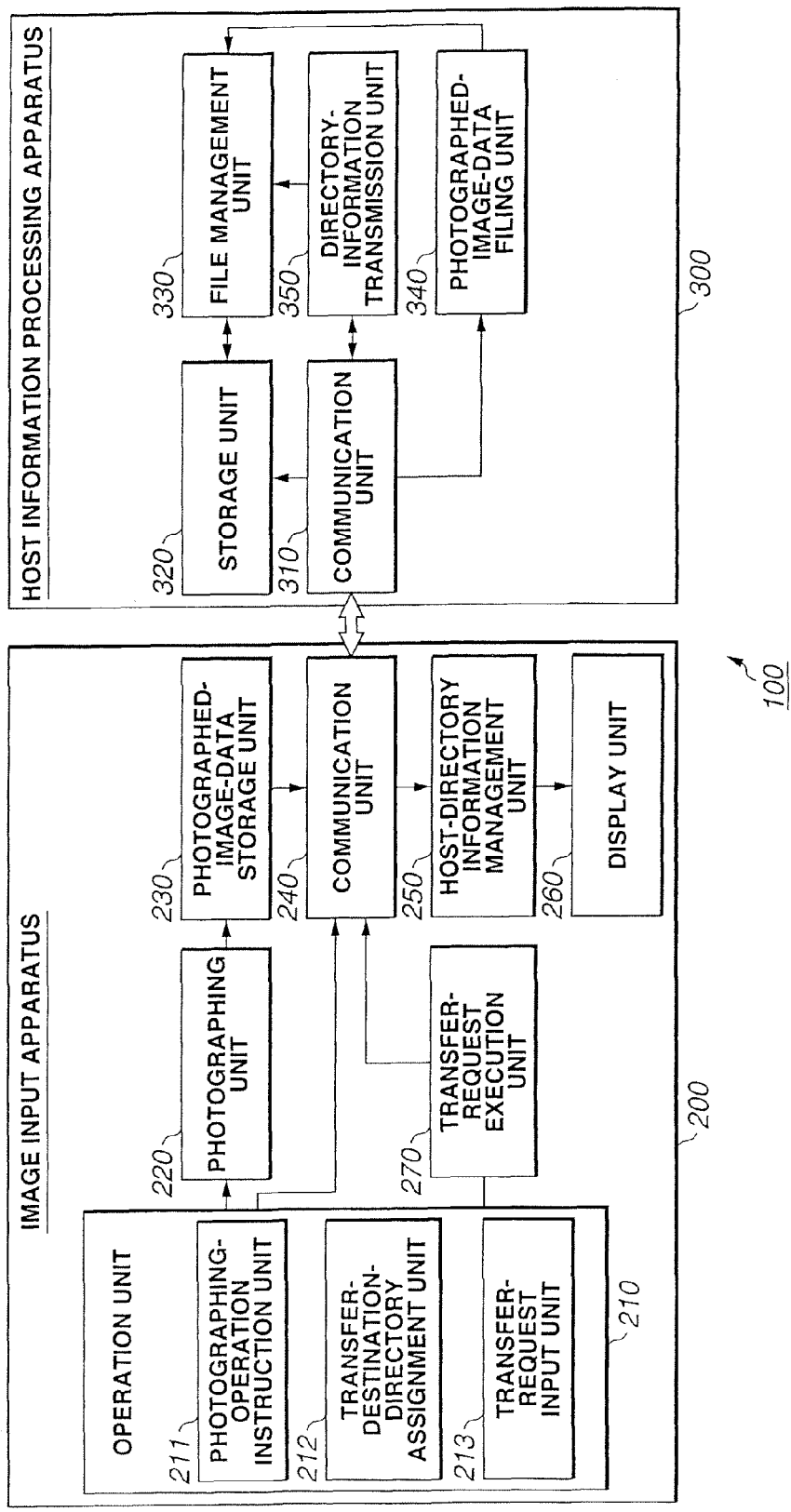
FIG. 1 is a block diagram illustrating the configuration of a photographed-image-data transfer system according to a first embodiment of the present invention.

In a first embodiment of the present invention, the present invention is applied, for example, to a photographed-image-data transfer system 100 shown in FIG. 1.

In this photographed-image-data transfer system 100, an image input apparatus 200 having a photographing function, and a host information processing apparatus 300 are connected to each other so as to be able to perform communication. A standard interface, such as USB (Universal Serial Bus) or the like (shown as a double-headed arrow in FIG. 1) may be used between these apparatuses.

The image input apparatus 200 includes an operation unit 210 for performing an instruction for a photographing operation, an instruction for transfer of image data, and the like, a photographing unit 220 for performing a photographing operation in accordance with an operation through the operation unit 210, a photographed-image-data storage unit 230 for storing image data obtained by the photographing unit 220, a communication unit 240 for performing transmission/reception of image data, commands and the like with the host information processing apparatus 300, a host-directory-information management unit 250 for managing host-directory information (to be described later) obtained via the communication unit 240, a display unit 260 for visualizing and displaying information managed by the host-directory-information management unit 250, and a transfer-request execution unit 270 for executing a request for transfer of image data, or the like input through the operation unit 210.

The operation unit 210 includes a photographing-operation instruction unit 211 for instructing a photographing operation by the photographing unit 220, a transfer-destination-directory assignment unit 212 for assigning a transfer-destination directory when transferring image data to the host information processing apparatus 300, and a transfer-request input unit 213 for instructing a request for transfer of image data to the directory assigned by the transfer-destination-directory assignment unit 212.

The host information processing apparatus 300 includes a communication unit 310 for performing transmission/reception of image data, commands and the like with the image input apparatus 200, a (nonvolatile) storage unit 320 for storing image data, various other data and the like obtained via the communication unit 310, a file management unit 330 for managing the data stored in the storage unit 320 with a concept of a directory of a hierarchical structure and a file contained in the directory, a directory-information transmission unit 350 for transmitting information relating to a directory managed by the file management unit 330 in response to a request from the image input apparatus 200, and a photographed-image-data filing unit 340 for forming a new file within a directory assigned from the image input apparatus 200 and storing received image data in the new file.

In the above-described photographed-image-data transfer system 100, image data obtained by the image input apparatus 200 can be transferred to a desired directory in the host information processing apparatus 300, not by an operation at the host information processing apparatus 300, but by an operation at the image input apparatus 200. Such a configuration is the greatest feature of the first embodiment. According to this configuration, the photographed-image-data transfer system 100 operates in the following manner.

First, in the image input apparatus 200, the host-directory-information management unit 250 performs an inquiry, relating to the directory structure of data stored in the storage unit 320, to the host information processing apparatus 300 via the communication unit 240.

In the host information processing apparatus 300, which has received the inquiry, the directory-information transmission unit 350 obtains information relating to the directory structure of data (hereinafter termed "host-directory information") stored in the storage unit 320, via the file management unit 330, and transmits the obtained information to the image input apparatus 200 via the communication unit 310.

Then, in the image input apparatus 200, the host-directory-information management unit 250 stores and manages the host-directory information transmitted from the host information processing apparatus 300.

The display unit 260 reads host-directory information managed by the host-directory-information management unit 250 whenever necessary, and visualizes and displays the read information. Thus, the user can review the directory structure in the host information processing apparatus 300. The display unit 260 may be incorporated in the apparatus as a color liquid-crystal display, or a display unit of an external apparatus may be used.

The user assigns a directory to which image data is to be transferred (hereinafter termed a "transfer-destination directory") while confirming host-directory information displayed on the display unit 260, through the transfer-destination-directory assignment unit 212 of the operation unit 210. After confirming on the display unit 260 that the transfer-destination directory has been correctly assigned, the user inputs a request for transfer of image data to the transfer-destination directory, through the transfer-request input unit 213 of the operation unit 210.

Then, the transfer-request execution unit 270 transmits a file-transfer command having the transfer-destination directory assigned by the user and the image data as parameters, to the host information processing apparatus 300 via the communication unit 240.

It is assumed that the image data to be transferred in response to the file-transfer command has been obtained in advance by a photographing operation by the photographing unit 220. For example, the user obtains a photographed image by performing a photographing operation through the photographing-operation instruction unit 211 of the operation unit 210. The photographed image data is temporarily stored in the photographed-image-data storage unit 230, and is then transferred to the host information processing apparatus 300 via the communication unit 240 in response to the file-transfer command.

In the host information processing apparatus 300, the photographed-image-data filing unit 340 forms a new file within the transfer-destination directory indicated by the command (the transfer-destination directory and the image data) from the image input unit 200 received by the communication unit 310, in response to the command, and sequentially writes in the new file the image data received according to the command. After writing all the image data in the new file, the image-data transfer processing in this system is terminated.

According to the above-described configuration, the user can transfer image data to a desired directory in the directory structure in the host information processing apparatus 300, without performing an operation at the host information processing apparatus 300.

Second Embodiment

Figure 2:
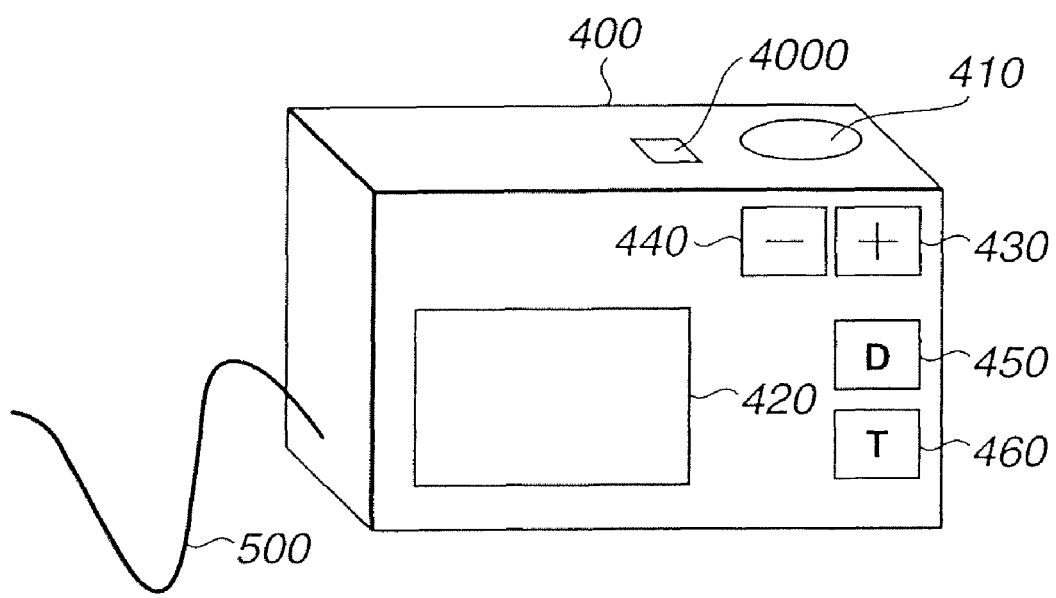
FIG. 2 is a diagram illustrating a digital still camera, serving as an image input apparatus of the photographed-image-data transfer system, according to a second embodiment of the present invention.
Figure 3:
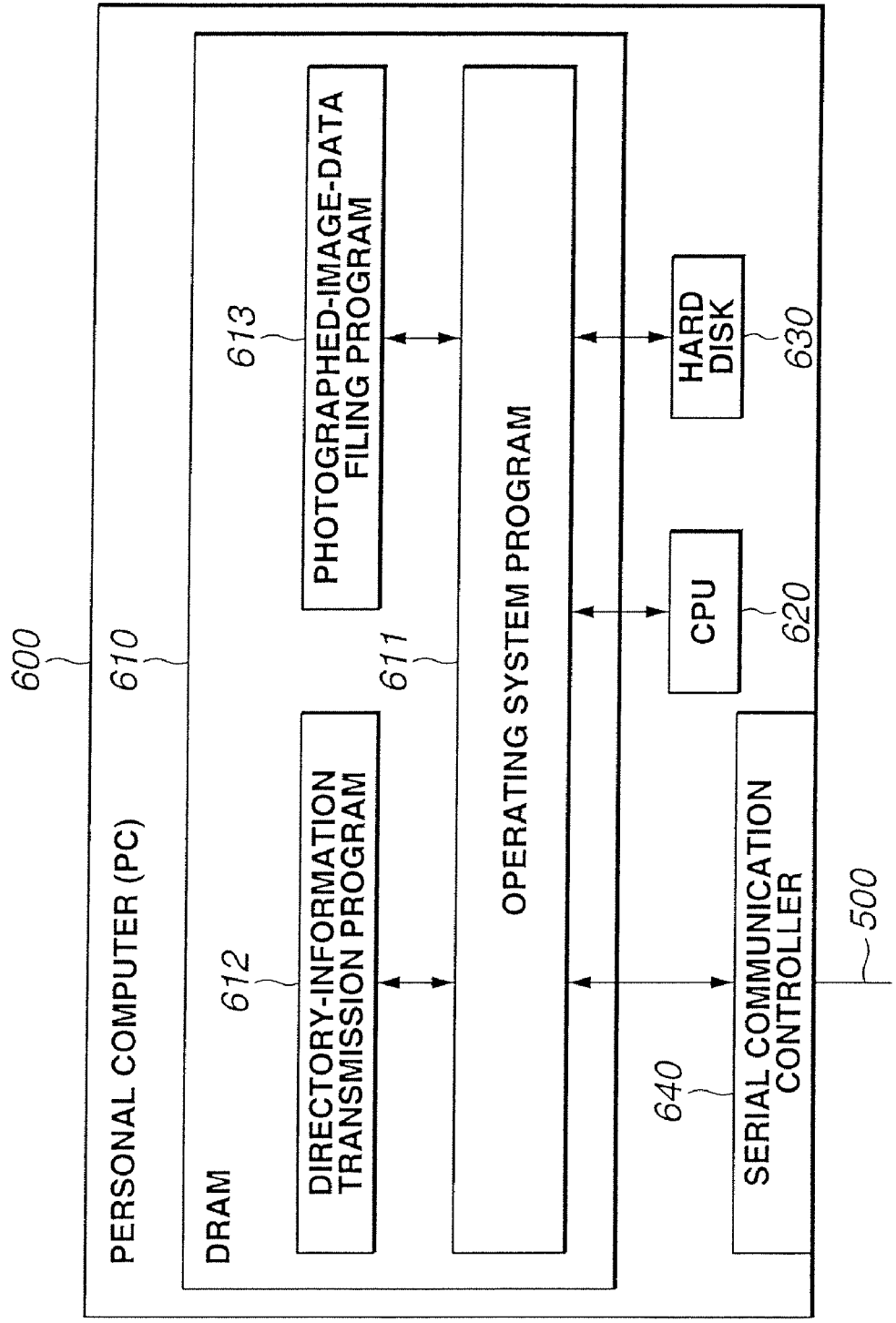
FIG. 3 is a diagram illustrating a personal computer, serving as a host information processing apparatus of the photographed-image-data transfer system.

In a second embodiment of the present invention, the configurations of the image input apparatus 200 and the host information processing apparatus 300 in the first embodiment are applied to a digital still camera 400 and a personal computer (PC) 600 shown in FIGS. 2 and 3, respectively, in order to realize more specific cases of application.

As shown in FIG. 2, the digital still camera 400 includes a photographing button 410, serving as the photographing-operation instruction unit 211, an LCD (liquid-crystal display) 420, serving as the display unit 260, a plus button 430, a minus button 440 and a D button 450, each serving as the transfer-directory assignment unit 212, and a T button 460, serving as the transfer-request input unit 213.

Each of the plus button 430 and the minus button 440 is used for selecting a transfer-destination directory in the directory structure in the PC 600, displayed on the LCD 420.

For example, directories are displayed in parallel on the LCD 420, and by operating the plus button 430, the transfer-destination directory can be sequentially shifted to the next directory. On the other hand, by operating the minus button 440, the transfer-destination directory can be shifted to the next directory in a direction reverse to the direction in the case of the plus button 430. The D button 450 is used for shifting the transfer-destination directory in a downward direction.

Accordingly, by operating appropriate ones of the plus button 430, the minus button 440 and the D button 450, the user selects a desired directory from the directory structure and assigns the selected directory as the transfer-destination directory.

The T button 460 is used for providing a request for transfer of image data to the directory assigned by operating appropriate ones of the plus button 430, the minus button 440 and the D button 450.

Accordingly, by depressing the T button 460, the user can transfer image data to a desired directory assigned by operating appropriate ones of the plus button 430, the minus button 440 and the D button 450.

Although not illustrated in FIG. 2, the above-described digital still camera 400 incorporates the photographing unit 220, the photographed-image-data storage unit 230, the communication unit 240, the host-directory-information management unit 250 and the transfer-request execution unit 270 which are shown in FIG. 1.

For example, the photographing unit 220 includes a lens, a shutter, a CCD (charge-coupled device), an A/D (analog-to-digital) converter, an image processing circuit and the like. By operating the photographing button 410, a photographing operation is started. Obtained photographed image data is temporarily stored in the photographed-image-data storage unit 230.

For example, a compact flash-memory card may be used as the photographed-image-data storage unit 230.

The function of the photographing unit 220 is not limited to the above-described function. For example, a function equivalent to a photographing function in an ordinary digital still camera may be adopted. Furthermore, the photographed-image-data storage unit 230 is not limited to a compact flash-memory card.

The digital still camera 400 is connected to the PC 600 via a serial cable 500, so as to be able to communicate with the PC 600 via the communication unit 240 (such as a controller for serial communication, or the like) within the digital still camera 400.

Although not illustrated in FIG. 2, the digital still camera 400 incorporates an MPU (microprocessor unit), a DRAM (dynamic random access memory), a ROM (read-only memory), an internal bus, a CCD driving circuit, an LCD driving circuit, and the like.

The operation of the entirety of the digital still camera 400 is controlled, for example, by sequentially reading each type of processing program (such as a processing program for executing the processing described in the first embodiment, or the like) from the ROM and executing the read program by the MPU. Each type of data generated at that time is temporarily stored in the DRAM if necessary.

On the other hand, as shown in FIG. 3, the PC 600 includes a DRAM 610 where an operating system program 611 or the like is to be loaded, a CPU (central processing unit) 620 for controlling the operation of the entire apparatus by executing a program loaded in the DRAM 610, a hard disk 630, serving as the storage unit 320, and a serial communication controller 640, serving as the communication unit 310.

The hard disk 630 has a hierarchical directory structure under the control of the operating system program 611 (to be described below).

The operating system program (hereinafter abbreviated as the "OS") 611 includes a program for executing the function of the file management unit 330. By loading the OS 611 in the DRAM 610 and executing the loaded OS 611 by the CPU 620, the function of file management for the hard disk (non-volatile storage medium) 630 is executed.

Programs to be loaded in the DRAM 610 are, in addition to the OS 611, a directory-information transmission program 612 for executing the function of the directory-information transmission unit 350, and a photographed-image-data filing program 613 for executing the function of the photographed-image-data filing unit 340.

Accordingly, by loading a corresponding one of these programs from the hard disk 630 to the DRAM 610 and executing the loaded program by the CPU 620, the processing described in the first embodiment is executed. Each type of data generated at that time is temporarily stored in the DRAM

610 if necessary. For example, photographed-image-data transmitted from the digital still camera 400 is also stored in the DRAM 610.

A description will now be more specifically provided of how image data is transferred to the transfer-destination directory in the PC 600 in accordance with a request from the user, between the digital still camera 400 and the PC 600.

(1) Directory Assignment and Image-data Transfer Processing at the Digital Still Camera 400

It is assumed that the digital still camera 400 has two modes, i.e., a photographing mode for performing a photographing operation by the photographing unit 220, and a photographed-image transfer mode for transferring image data obtained in the photographing mode. Accordingly, by operating a mode button 4000 shown in FIG. 2, the user can perform switching between the photographing mode and the photographed-image transfer mode.

Figure 4:
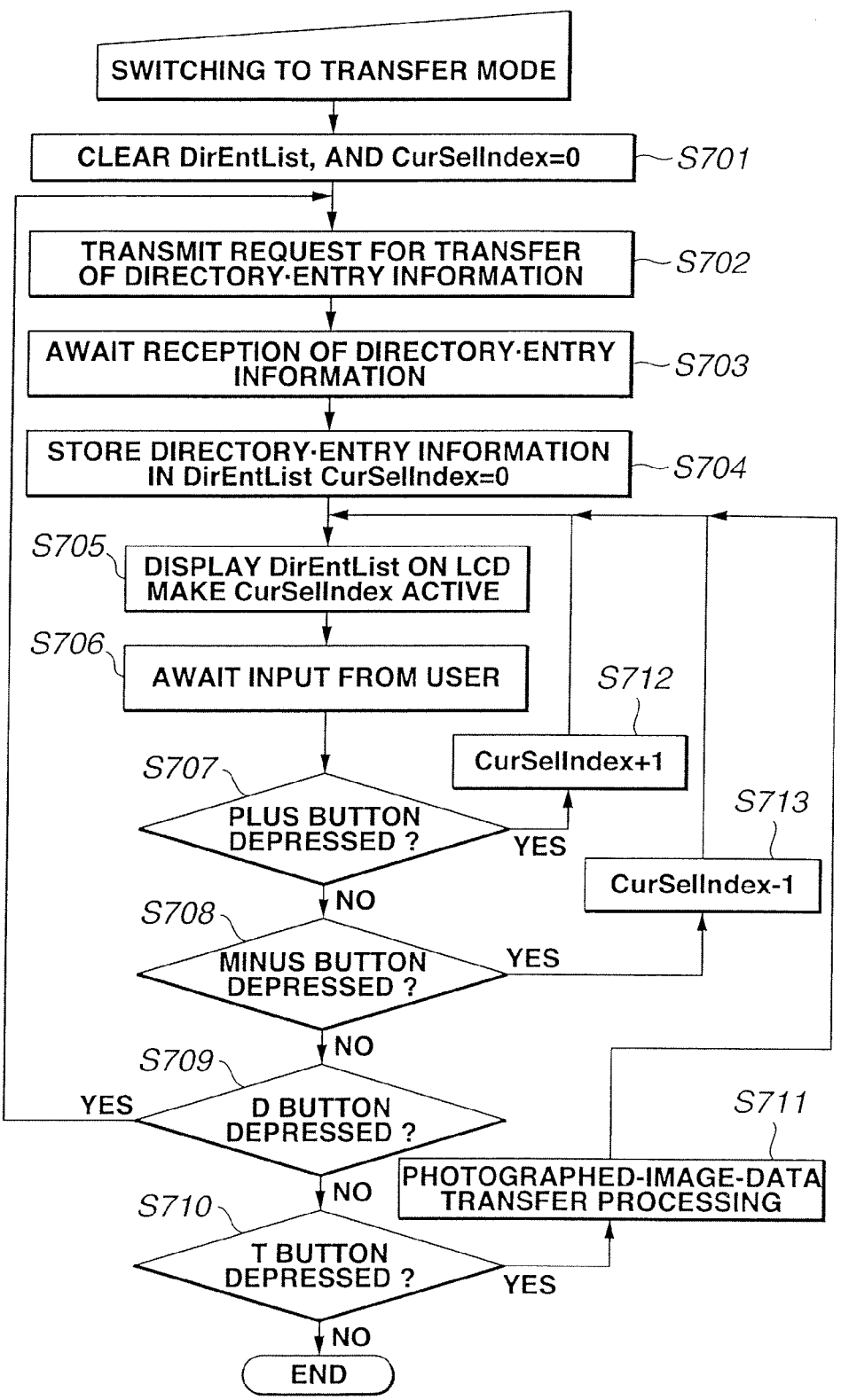
FIG. 4 is a flowchart illustrating directory assignment and photographed-image-data transfer processing in the digital still camera shown in FIG. 2.

FIG. 4 is a flowchart illustrating the operation of the digital still camera 400 when switching to the photographed-image transfer mode has been performed in the digital still camera 400.

Step S701:

First, the host-directory-information management unit 250 clears a directory entry list (hereinafter termed a "DirEntList") managed by the apparatus 200. The DirEntList indicates the list of the summary of the names of directories contained within a parent directory (hereinafter termed a "CurParentDir") of the currently selected directory (hereinafter termed a "CurSelDir") from among directories within the hard disk 630 of the PC 600. In the DirEntList, the names of respective directories are listed in alphabetical order.

The host-directory-information management unit 250 provides a value "0" as the initial value for an index for indicating the currently selected directory (hereinafter termed a "CurSelIndex"), within the DirEntList.

Step S702:

Next, the host-directory-information management unit 250 forms a command for requesting transfer of information relating to the directory structure in the PC 600 (IDC_GET_DIR_ENT), and transmits this command to the PC 600 via the communication unit 240.

A full path name for the CurSelDir (the directory within the hard disk 630 of the PC 600) (hereinafter termed a "CurSelPath") is provided as a parameter for the command (IDC_GET_DIR_ENT). A path name indicated by the index CurSelIndex is provided as the CurSelPath in the DirEntList (the list managed by the host-directory-information management unit 250).

When "CurSelIndex"=0, a null character is provided for the CurSelPath, in order to indicate that the DirEntList is vacant. Accordingly, in this case, the PC 600 transmits the list of the names of drives present in the filing system to the digital still camera 400.

Step S703:

When the command (IDC_GET_DIR_ENT) has been transmitted to the PC 600 in step S702, a state of awaiting reception of information relating to the directory structure (information relating to the summary of the names of directories positioned below the CurSelDir, hereinafter termed a "directory entry information") from the PC 600 is provided.

Upon reception of directory-entry information from the PC 600, the process proceeds to the next step S704.

Step S704:

Next, the host-directory-information management unit 250 acquires the directory-entry information from the PC 600 via the communication unit 310, and stores the names of directories contained in the directory-entry information in alphabetical order in the DirEntList. Then, the host-directory-information management unit 250 sets the CurSelIndex to "1".

At that time, when the directory-entry information from the PC 600 is vacant, the host-directory-information management unit 250 does not update the current contents of the DirEntList and the CurSelIndex in the hard disk 630 of the PC 600, in order to indicate that directories below the CurSelPath do not exist.

Step S705:

Next, the host-directory-information management unit 250 displays the summary of the contents of the current DirEntList on the LCD 420. The host-directory-information management unit 250 also performs a display surrounding a directory indicated by the index CurSelIndex as the currently selected directory, on the display picture frame on the LCD 420.

Figure 5A:
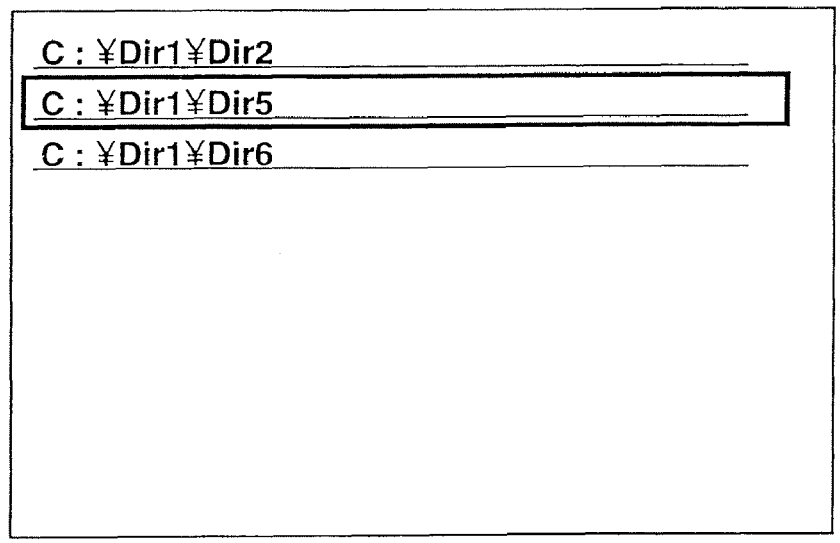
FIGS. 5A and 5B are diagrams illustrating a directory structure in the personal computer, displayed on a display unit of the digital still camera.
Figure 5B:
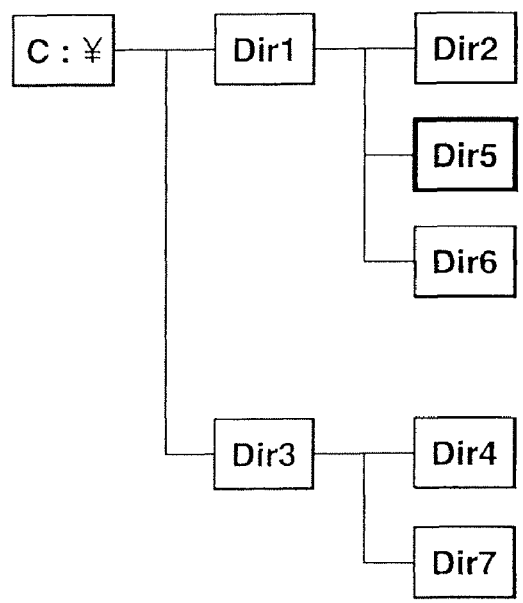

For example, when the directory structure managed by the filing system of the PC 600 (the directory structure managed by the function of the file management unit 330 by the OS 611) is a structure as shown in FIG. 5B, the state of display on the LCD 420 is as shown in FIG. 5A. In FIGS. 5A and 5B, since a directory "C:¥Dir1¥Dir5" is selected, portions relating to this directory are surrounded by thick lines.

Step S706:

Then, a state of awaiting input of assignment of a transfer-destination directory from the user is provided (step S706).

When one of the buttons provided on the digital still camera 400 has been operated by the user in step S706, the process proceeds to step S707.

Steps S707 and S712:

Information relating to an operation by the user is transmitted to the host-directory-information management unit 250, which determines if the plus button 430 has been depressed (step S707).

If the result of the determination in step S707 is affirmative, the host-directory-information management unit 250 increments the value of the index CurSelIndex by one (+1) (step S712). The process then returns to step S705, and the succeeding steps are again executed. For example, in the case of FIG. 5A, the selected directory would shift to the next directory "C:¥Dir1¥Dir2", which would be surrounded by thick lines.

When the value of the index CurSelIndex indicates the last directory (a directory "C:¥Dir1¥Dir6" in the case of FIG. 5A), the value of the index CurSelIndex is not updated, and the process returns to step S705.

Steps S708 and S713:

If the result of the determination in step S707 is negative, the host-directory-information management unit 250 determines if the minus button 440 has been depressed (step S708).

If the result of the determination in step S708 is affirmative, the host-directory-information management unit 250 decrements the value of the index CurSelIndex by one (−1) (step S713). The process then returns to step S705, and the succeeding steps are again executed. For example, in the case of FIG. 5A, the selected directory would shift to the immediately preceding directory "C:¥Dir1¥Dir2", which would be surrounded by thick lines.

When the value of the index CurSelIndex indicates the first directory (a directory "C:¥Dir1¥Dir2" in the case of FIG. 5A), the value of the index CurSelIndex is not updated, and the process returns to step S705.

Step S709:

If the result of the determination in step S708 is negative, the host-directory-information management unit 250 determines if the D button 450 has been depressed (step S709).

If the result of the determination in step S709 is affirmative, the process returns to step S702, where a request for transfer of information relating to directories present below the currently selected directory on the LCD 420 is transmitted.

Step S710:

If the result of the determination in step S709 is negative, the host-directory-information management unit 250 determines if the T button 460 has been depressed (step S710).

If the result of the determination in step S710 is negative, i.e., when the depressed button is none of the plus button 430, the minus button 440, the D button 450 and the T button 460, it is recognized that a button for turning off the power supply of the digital still camera 400, a button for performing a mode change to the photographing mode, or the like has been depressed, and the current processing is terminated in order to shift to processing corresponding to the depressed button.

Step S711:

If the result of the determination in step S710 is affirmative, processing of transferring photographed image data is performed (step S711).

That is, the transfer-request execution unit 270 forms a command indicating the start of transfer of photographed image data (IDC_SEND_DATA_AND_PATH), transmits the formed command to the PC 600 via the communication unit 240, and also transmits the name of a directory path indicated by the index CurSelIndex in the current DirEntList (CurSelPath) and the name of a directory to which the photographed image data is to be transmitted (hereinafter termed a "TransDirPath") to the PC 600 via the communication unit 240 as command parameters. The transfer-request execution unit 270 also transmits image data currently stored in the photographed-image-data storage unit 230 to the PC 600 via the communication unit 240 as a command parameter.

Upon completion of the processing of transferring the photographed image data in step S711, the process returns to step S705.

(2) Processing of Transmitting Directory-entry Information at the PC 600

Figure 6:
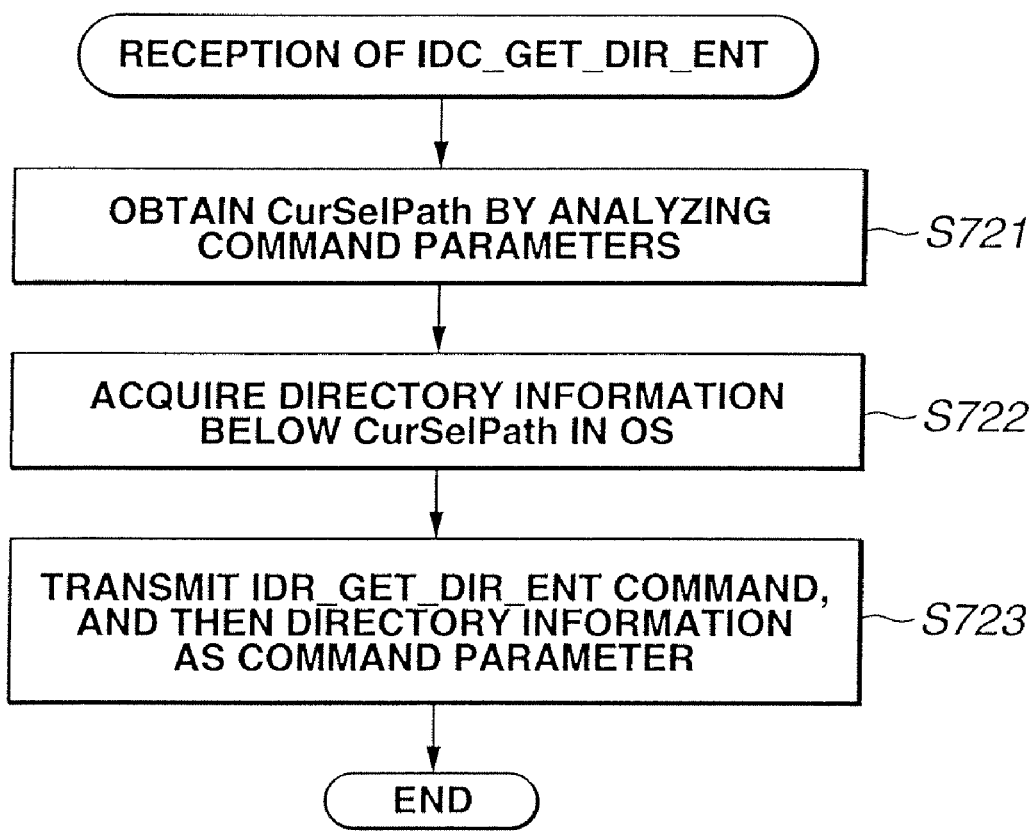
FIG. 6 is a flowchart illustrating directory-information transmission processing in the personal computer.

FIG. 6 is a flowchart illustrating processing of transmitting directory-entry information by execution of the directory-information transmission program 612, when the PC 600 has received the command (IDC_GET_DIR_ENT) from the digital still camera 400.

That is, upon transmission of the command (IDC_GET_DIR_ENT) from the digital still camera 400, the PC 600 which has received this command executes the processing of the following steps S721-S723 by executing the directory-information transmission program 612.

Step S721:

First, by analyzing parameters of the command (IDC_GET_DIR_ENT), a directory name (CurSelPath) is obtained. The obtained directory name is represented, for example, by "C:¥Dir1¥Dir5".

Step S722:

Next, directory-entry information relating to directories positioned below the "C:¥Dir1¥Dir5" is obtained from the file management function by the OS 611. It is assumed, for example, that directories "Dir6" and "Dir7" are present below the "C:¥Dir1¥Dir5".

Step S723

Then, a command for a response (IDR_GET_DIR_ENT) to the command (IDR_DIR_ENT) from the digital still camera 400 is transmitted to the digital still camera 400 via the serial communication controller 640.

Then, the directory-entry information acquired in step S722 is transmitted to the digital still camera 400 via the serial communication unit 240 as a parameter of the command (IDR_GET_DIR_ENT). This parameter is formed by delimiting the full path name of the obtained directory entry with a null character, and adding two null characters after the last full path name in order to indicate the last of the entry information, such as:

C:¥Dir1¥Dir5¥Dir6<NULL>
C:¥Dir1¥Dir5¥Dir7<NULL><NULL>.

It is thereby possible to transmit a plurality of sets of entry information.

(3) Photographed-image-data Filing Processing at the PC 600

Figure 7:
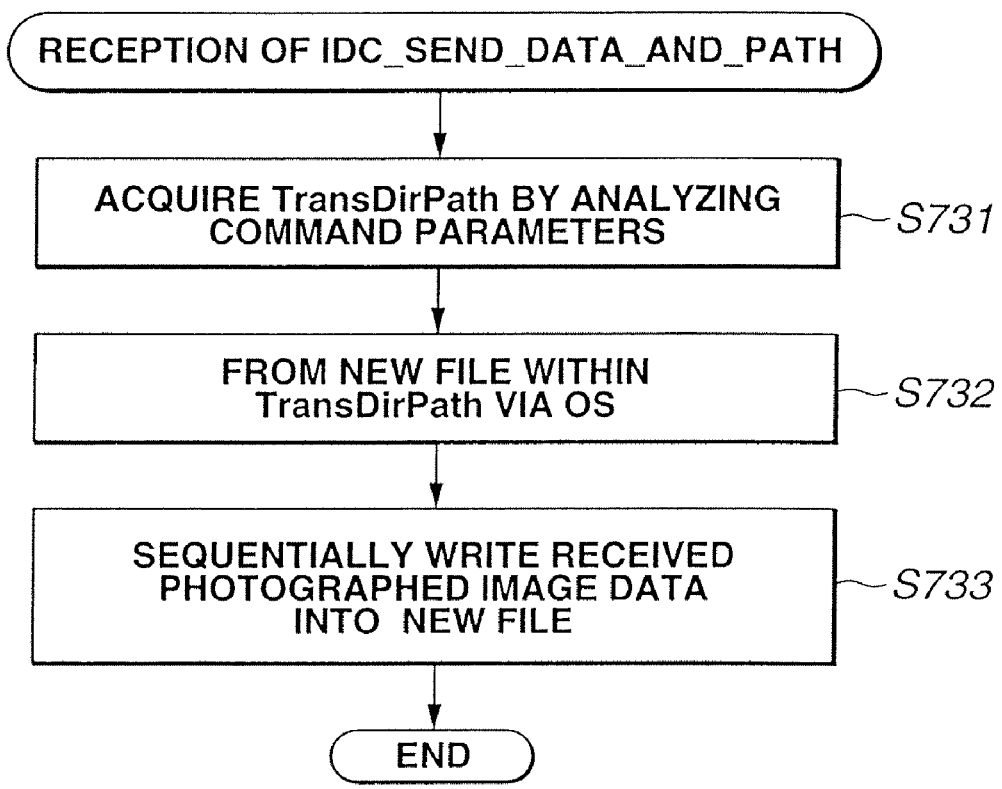
FIG. 7 is a flowchart illustrating photographed-image-data filing processing in the personal computer.

FIG. 7 is a flowchart illustrating photographed-image-data filing processing by execution of the photographed-image-data filing program 613, when a command (IDC_SEND_DATA_AND_PATH) from the digital still camera 400 has been received.

That is, when the command (IDC_SEND_DATA_AND_PATH) has been transmitted from the digital still camera 400, the PC 600 which has received this command executes the following processing of steps S731-S733 by executing the photographed-image-data filing program 613.

Step S731:

First, by analyzing parameters of the command (IDC_SEND_DATA_AND_PATH), a transfer-destination-directory path (TransDirPath) is obtained. The contents of the obtained transfer-destination-directory path (TransDirPath) are represented, for example, by "C:¥Dir1¥Dir5¥Dir7".

Step S732:

Next, by the file management function by the OS 611, a new file is generated within the directory "C:¥Dir1¥Dir5¥Dir7" indicated by the transfer-destination-directory path (TransDirPath) acquired in step S731. The name of the new file is represented by "NewFile1".

Step S733:

Image data transmitted after the transfer-destination-directory path (TransDirPath) from the digital still camera 400 is received, and is sequentially written in the new file NewFile1. Upon completion of writing of the image data, this processing is terminated.

Although in the above-described second embodiment, transfer is performed by depressing the T button 460 for transfer, the present invention is not limited to such an approach. For example, transfer may be performed only by assigning a transfer-destination directory. For that purpose, a switch for confirming a transfer-destination directory may be provided instead of step S710, and data may be transferred under a predetermined condition, for example, after the lapse of a predetermined time period, when this switch has been depressed.

The objects of the present invention may, of course, also be achieved by supplying a system or an apparatus with a storage medium storing program codes of software for realizing the functions of the host apparatus and the terminal of each of the above-described embodiments, and reading and executing the program codes stored in the storage medium by means of a computer (or a CPU or an MPU) of the system or the apparatus.

In such a case, the program codes themselves read from the storage medium realize the functions of each of the above-described embodiments, so that the storage medium storing the program codes constitutes the present invention.

For example, a floppy disk, a hard disk, an optical disk, a magnetooptical disk, a CD(compact disc)-ROM, a CD-R (recordable), a magnetic tape, a nonvolatile memory card or the like may be used as the storage medium for supplying the program codes.

The present invention may, of course, be applied not only to a case in which the functions of each of the above-described embodiments are realized by executing program codes read by a computer, but also to a case in which an OS or the like operating in a computer executes a part or the entirety of actual processing based on instructions of the program codes, and the functions of each of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of each of the above-described embodiments are realized by the processing.

Although in the second embodiment, the case of transferring data to a file having a directory structure as shown in FIG. 5B, is described the present invention is not limited to such an approach. The present invention may also be applied to various other data structures.

As described above, according to the foregoing embodiments, when transferring arbitrary information to storage means of an externally connected apparatus (a second apparatus), it is possible to transfer the arbitrary information to a desired directory only by an operation at a user's apparatus (a first apparatus). Hence, even a user who does not know well how to deal with a host information processing apparatus (the second apparatus), such as a personal computer or the like, can easily transfer image data obtained by a photographing operation by an image input apparatus (the first apparatus) to the host information processing apparatus and manage the image data.

The individual components shown in outline or designated by blocks in the drawings are all well known in the information processing apparatus, information processing system and information processing method arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A digital camera that transfers image data to an external apparatus, comprising:
a display unit configured to display a transfer screen, wherein, when said display unit displays the transfer screen, a plurality of proposed transfer destinations of the image data are displayed on the transfer screen, and wherein the plurality of proposed transfer destinations of the image data displayed on the transfer screen are at least a portion of a hierarchical directory structure in the external apparatus;
an assignment unit configured to assign a transfer destination of the image data from among the plurality of proposed transfer destinations of the image data on the transfer screen displayed on the display unit, wherein the assignment unit controls the digital camera to change the portion of the hierarchical directory structure in the external apparatus to be displayed on the transfer screen;
an instruction unit configured to instruct transfer of the image data; and
a transmission unit configured to transmit the image data to the transfer destination of the image data assigned by the assignment unit, when the instruction unit instructs to transfer the image data.

2. The digital camera according to claim 1, further comprising an obtaining unit configured to obtain information relating to the transfer destination, from the external apparatus.

3. The digital camera according to claim 1, wherein the assignment unit comprises a pair of operation buttons for performing an assigning operation on the transfer screen.

4. The digital camera according to claim 1, further comprising:
a directory-information obtaining unit configured to obtain directory information from the external apparatus;
a generation unit configured to generate a screen representing a directory structure, by using the obtained directory information; and
a display control unit configured to control the display unit to display the screen generated by the generation unit as the transfer screen.

5. The digital camera according to claim 1, wherein a directory of the external apparatus is specified as the transfer destination of the image data.

6. A method for controlling a digital camera that transfers image data to an external apparatus, comprising:
a display step for displaying a transfer screen, wherein, when said display step displays the transfer screen, a plurality of proposed transfer destinations of the image data are displayed on the transfer screen, and wherein the plurality of proposed transfer destinations of the image data displayed on the transfer screen are at least a portion of a hierarchical directory structure in the external apparatus;
an assignment step for assigning a transfer destination of the image data from among the plurality of proposed transfer destinations of the image data on the transfer screen displayed in the display step, wherein the assignment step controls the digital camera to change the portion of the hierarchical directory structure in the external apparatus to be displayed on the transfer screen;
an instruction step for instructing transfer of the image data; and
a transfer step for transferring the image data to the transfer destination of the image data assigned in the assignment step, when there is an instruction to transfer the image data in the instruction step.

7. The method for controlling the digital camera according to claim 6, wherein a digital camera according to claim 1, wherein a directory of the external apparatus is specified as the transfer destination of the image data.

8. The method for controlling the digital camera according to claim 7, further comprising an obtaining step for obtaining information relating to the transfer destination, from the external apparatus.

9. The method for controlling the digital camera according to claim 7, wherein an assigning operation on the transfer screen is performed by a pair of buttons in the assignment step.

10. The method for controlling the digital camera according to claim 7, further comprising:
a directory-information obtaining step for obtaining directory information from the external apparatus;

a generation step for generating a screen representing a directory structure, by using the obtained directory information; and a display control step for performing control so that the screen generated in the generating step is displayed as the transfer screen.

11. A non-transitory computer readable medium having a program causing the computer to perform:
- a displaying process of displaying a transfer screen, wherein, when said display process displays the transfer screen, a plurality of proposed transfer destinations of the image data area displayed on the transfer screen, and wherein the plurality of proposed transfer destinations of the image data displayed on the transfer screen are at least a portion of a hierarchical directory structure in the external apparatus;
- an assignment process of assigning a transfer destination of the image data from among the plurality of proposed transfer destinations of the image data on the transfer screen displayed in the display process, wherein the assignment process controls the digital camera to change the portion of the hierarchical directory structure in the external apparatus to be displayed on the transfer screen;
- an instruction process for instructing to transfer the image data; and
- a transfer process for transferring the image data to the transfer destination of the image data in the assignment process, when there is an instruction to transfer the image data in the instruction process.

12. The computer readable medium according to claim 11, wherein a directory of the external apparatus is specified as the transfer destination of the image data.

13. The computer readable medium according to claim 11, further comprising a directory-information obtaining process for obtaining information relating to the transfer destination, from the external apparatus.

14. The computer readable medium according to claim 11, further comprising:
- a directory-information obtaining process for obtaining directory information from the external apparatus;
- a generation process of generating a screen representing a directory structure, by using the obtained directory information; and
- a display control process of performing control so that the screen generated in the generating step is displayed as the transfer screen.

15. A digital camera that transfers image data to an external apparatus, comprising:
- display means for displaying a transfer screen, wherein, when said display means displays the transfer screen, a plurality of proposed transfer destinations of the image data area displayed on the transfer screen, and wherein the plurality of proposed transfer destinations of the image data displayed on the transfer screen are at least a portion of a hierarchical directory structure in the external apparatus;
- assignment means for assigning a transfer destination of the image data from among the plurality of proposed transfer destinations of the image data on the transfer screen displayed on the display means, wherein the assignment means controls the digital camera to change the portion of the hierarchical directory structure in the external apparatus to be displayed on the transfer screen;
- instruction means for instructing transfer of the image data; and
- transmission means for transmitting the image data to the transfer destination of the image data by the assignment means, when the instruction means instructs to transfer the image data.

16. The digital camera according to claim 15, wherein a directory of the external apparatus is specified as the transfer destination of the image data.

17. The digital camera according to claim 15, further comprising a directory-information obtaining means configured to obtain information relating to the transfer destination, from the external apparatus.

18. The digital camera according to claim 15, further comprising:
- a directory-information obtaining means configured to obtain directory information from the external apparatus;
- a generation means configured to generate a screen representing a directory structure, by using the obtained directory information; and
- a display control means configured to control the display unit to display the screen generated by the generation unit as the transfer screen.

* * * * *